United States Patent
Morelli et al.

(10) Patent No.: US 12,137,076 B1
(45) Date of Patent: Nov. 5, 2024

(54) INTEGRATION OF MULTIPLE INTERFACES OF A COMMUNICATION SERVICE

(71) Applicant: Clubster, LLC, Mercer Island, WA (US)

(72) Inventors: McRedmond Morelli, Mercer Island, WA (US); Patrick James Murray, Lancaster, OH (US); Bryan Freitas, Angra do Heroísmo (PT); William J. King, Dallas, TX (US)

(73) Assignee: Clubster, LLC, Mercer Island, WA (US)

( * ) Notice: Subject to any disclaimer, the term of this patent is extended or adjusted under 35 U.S.C. 154(b) by 0 days.

(21) Appl. No.: 18/223,945

(22) Filed: Jul. 19, 2023

(51) Int. Cl.
*H04L 51/56* (2022.01)
*H04L 51/216* (2022.01)

(52) U.S. Cl.
CPC ............ *H04L 51/56* (2022.05); *H04L 51/216* (2022.05)

(58) Field of Classification Search
CPC .............................. H04L 51/56; H04L 51/216
See application file for complete search history.

(56) References Cited

U.S. PATENT DOCUMENTS

| | | | | |
|---|---|---|---|---|
| 7,664,657 B1* | 2/2010 | Letzt | ................... | G06Q 10/06 705/2 |
| 10,764,233 B1* | 9/2020 | Goldberg | ................ | H04L 51/56 |
| 2003/0220784 A1* | 11/2003 | Fellenstein | ........... | H04M 3/533 704/201 |
| 2004/0019476 A1* | 1/2004 | Glynn | ..................... | G10L 15/26 704/E15.045 |
| 2006/0133585 A1* | 6/2006 | Daigle | .................. | G06F 40/263 379/88.06 |
| 2006/0253281 A1* | 11/2006 | Letzt | ....................... | G10L 15/30 704/E15.047 |
| 2008/0215323 A1* | 9/2008 | Shaffer | ............... | H04M 3/5335 704/E15.014 |
| 2010/0169424 A1* | 7/2010 | Gustafsson | ............. | H04L 51/56 709/206 |
| 2012/0124483 A1* | 5/2012 | Zuckerberg | ............. | H04L 51/08 715/752 |
| 2013/0101097 A1* | 4/2013 | Shaw | .................... | H04M 3/537 379/88.22 |

(Continued)

FOREIGN PATENT DOCUMENTS

WO WO-2014086424 A1 * 6/2014 ........... G10L 15/005

*Primary Examiner* — Philip C Lee (57) ABSTRACT

Methods, systems, and apparatus, including computer programs encoded on a computer storage medium, to integrate multiple interfaces of a communication service are disclosed. In one aspect, a method includes the actions of determining that a message is designated for output to a user through a first user interface. The actions include determining that the message is to be output through a second user interface. The actions include outputting the message through the second user interface. The actions include generating an updated message to be output through the first user interface. The actions include outputting the updated message through the first user interface. The actions include receiving, from the user through the first user interface, a response to the updated message. The actions include generating an updated response to be output through the second user interface. The actions include outputting the updated response through the second user interface.

21 Claims, 3 Drawing Sheets

(56) References Cited

U.S. PATENT DOCUMENTS

2019/0147885 A1* 5/2019 Zhang .................... G06F 21/32
 704/244
2023/0120471 A1* 4/2023 Vembu .................... H04L 67/10
 709/206

* cited by examiner

INTEGRATION OF MULTIPLE INTERFACES OF A COMMUNICATION SERVICE

TECHNICAL FIELD

This specification generally relates to communication services, and, in more detail, communication services having a plurality of user interfaces.

BACKGROUND

Clubs are an enduring institution that bring people together for a variety of purposes. There are many kinds of clubs, some more formal, some informal, but most clubs have a need to communicate with their members and a desire to facilitate communication among members. Over the years different types and modes of communication have waxed and waned in popularity and more recently there has been a proliferation of types of computer-facilitated communication. Individuals may have preferred types and modes of communication depending on the club or activity, or just in general. Particular activities may lend themselves to particular types or modes of communication.

SUMMARY

Smart phone applications and web applications can be used create a compelling and high engagement communication service for clubs and their members. However, some club members may persist in using legacy communication channels such as email. There can be technical challenges in integrating such legacy communication channels with smart phone applications, web applications, and other high engagement communication services. For example, as part of supporting relatively low engagement members, communication channel messages may be converted to an email format and sent to a member's email inbox. It may be common for email users to reply to these emails. It may be desirable that this email functionality is integrated into the high engagement communication service in a manner that does not surprise the member. The member may expect that replying to an email result in any number of outcomes such as (i) sending a message to club staff, (ii) reserving a place at an event, or (iii) adding a comment to the originating newsfeed post. However, without special integration, it is conventional for such replies to end up in a "no reply" bin and never read by a human being. In addition, the nature of the changing email environment means that some techniques that could previously be used for integration no longer function effectively, for example, email address spoofing.

An innovative aspect of the subject matter described in this specification may be implemented in methods that include the actions of determining, by a computing device, that a message is designated for output to a user through a first user interface; determining, by the computing device, that the message is configured to be output through a second user interface; providing, for output by the computing device, the message through the second user interface; generating, by the computing device, an updated message that is configured to be output through the first user interface; providing, for output by the computing device, the updated message through the first user interface; receiving, by the computing device and from the user through the first user interface, a response to the updated message; generating, by the computing device, an updated response that is configured to be output through the second user interface; and providing, for output by the computing device, the updated response through the second user interface.

These and other implementations can each optionally include one or more of the following features. The actions include determining, by the computing device, to designate the message for output to the user through the first user interface based on characteristics of the user. The actions include receiving, by the computing device and from an additional user through the second user interface, an additional response to the updated response or the message; generating, by the computing device, an updated additional response that is configured to be output through the first user interface; and providing, for output by the computing device, the updated additional response through the first user interface. The actions include determining, by the computing device, characteristics of the response to the updated message. The action of generating the updated response is based on the characteristics of the response to the updated message. The second user interface is a web application or a smart phone application. The first user interface is an email interface or a voice interface.

The actions include determining, by the computing device, that an additional message is designated for output to the user through the first user interface; determining, by the computing device, that the additional message is configured to be output through the second user interface; generating, by the computing device, an updated additional message that is configured to be output through the first user interface; providing, for output by the computing device, the updated additional message through the first user interface; receiving, by the computing device and from the user through the first user interface, an additional response to the updated additional message; generating, by the computing device, an updated additional response; based on characteristics of the additional response or the updated additional message, determining, by the computing device, a destination for the updated additional response; and providing, for output by the computing device and to the destination, the updated additional response.

The actions include determining, by the computing device, characteristics of the message and the first user interface. The action of generating the updated message is based on the characteristics of the message and the first user interface. The action of generating the updated message that is configured to be output through the first interface includes including, in the updated message, a tag. The action of receiving the response to the updated message includes determining that response includes the tag; and, based on the tag, determining that the response corresponds to the updated message.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. Clubs can engage with members through additional interfaces than what the systems of the club may be natively configured to handle. This can reduce the need for additional systems that are natively configured to communicate through the additional interfaces.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
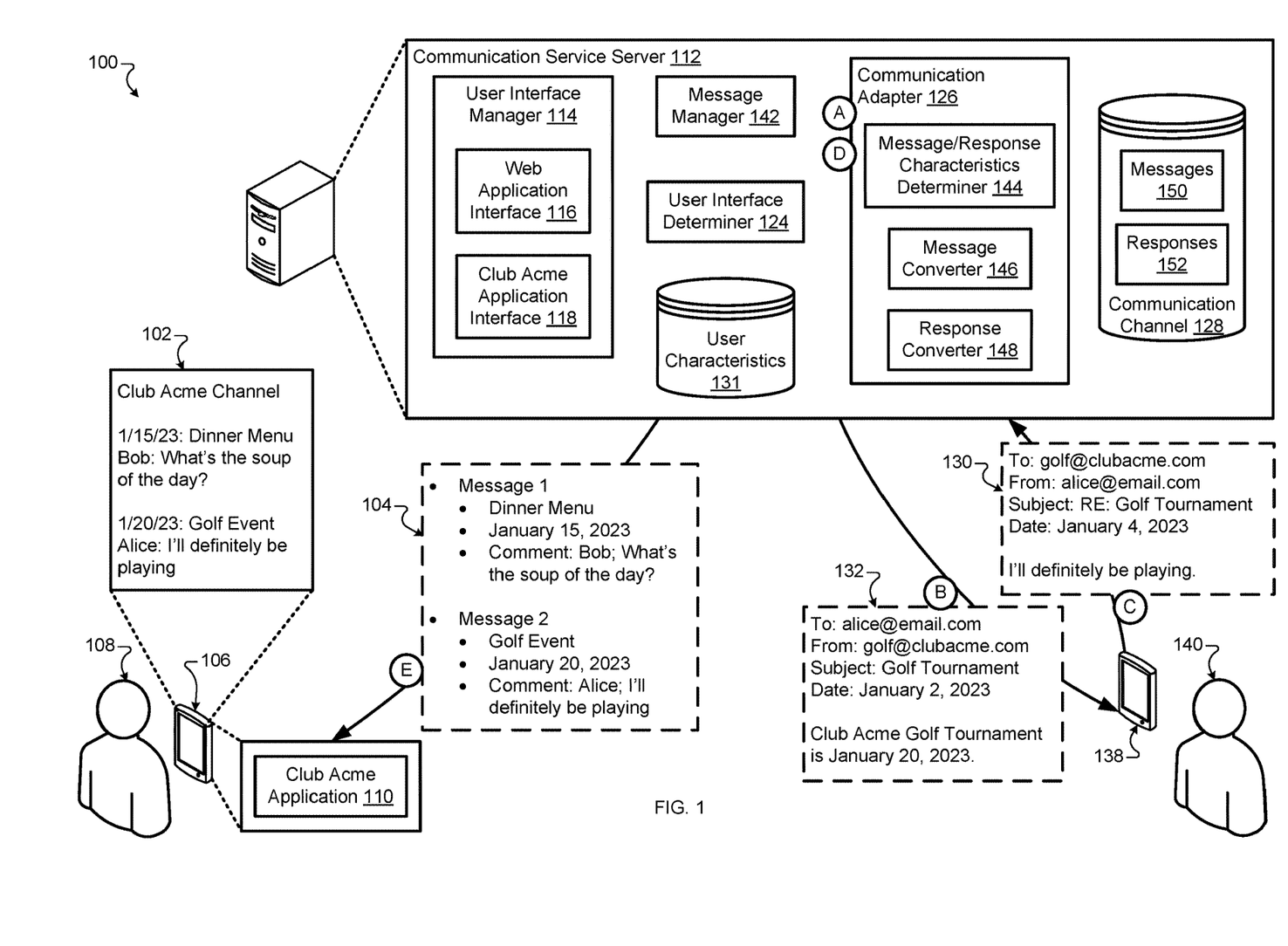
FIG. 1 illustrates an example system that is configured to integrate multiple interfaces of a communication service in accordance with at least one embodiment.

FIG. 1 illustrates an example system 100 that is configured to integrate multiple interfaces of a communication service. Briefly, and as described in more detail below, the user 108 and 140 may be attempting to interact with a communication service. The communication service may provide a newsfeed, event calendar, reservation service, etc. for a club. The user 108 may be more comfortable interacting with the communication service using a native mobile application 110 while the user 140 may be more comfortable interacting with the communication service using different modes of communication such as email or voice. The native mobile application 110 may provide the user 108 with access to the various functionalities of the communication service. Using email, voice, or another mode of communication to access the communication service may provide the user 140 with limited access to some of the functionalities of the communication service. To provide the user 140 with improved access, the communication service may include a communication adapter 126 that is configured to convert messages of the communication service and responses from the user 140. This conversion may allow the user 140 to enjoy the benefits of the native mobile application 110 while using a different interface. FIG. 1 includes various stages A through E that may illustrate the performance of actions and/or the movement of data between various components of the system 100. The system 100 may perform these stages in any suitable order.

In more detail, the communication service server 112 is configured to manage communication channels for various clubs. The communication service server 112 may include any suitable type of computing device that is configured to communicate with other computing devices. For example, the communication service server 112 may include a desktop computer, a laptop computer, a mobile device, a wearable device, a mainframe computer, a tablet, and/or any other similar type of device. In some implementations, the communication service server 112 may include a virtual device that is located in the cloud. In some implementations, the different components of the communication service server 112 may be located on different computing devices including virtual devices.

Each club may have one or more communication channels to disseminate information to members, receive information from the members, and allow members to interact with each other. The communication channels may be related to various interest groups within a club. The interest groups may include a golf group, a tennis group, swimming group, a dining group, and/or any other similar group. The communication service server 112 may use various interfaces to reach each of the interest groups and allow the users in the group to view the messages on the communication channel, receive information from the users, and interact with each other.

The communication service server 112 may implement a user interface manager 114 by executing software on one or more processors. The user interface manager 114 may include the various interfaces to interact with the users. The interfaces may include a web application interface 116, a native mobile application interface 118, a social media network interface, and/or any other similar type of interface. Each of the interfaces may be configured to provide data of the communication channels to corresponding applications. The data may include various communication channel messages 150 that the club wishes to disseminate to the various users of the club who may have requested messages related to different interest groups. The data may also include communication channel responses 152 that include comments, reactions, questions, and/or any other similar member input to the communication channel messages 150.

The communication service server 112 may implement a message manager 142 by executing software on one or more processors. The message manager 142 may be configured to receive messages from various clubs, store those messages in the communication channel messages 150, and coordinate outputting those messages through the various interfaces. The messages may include any suitable type of text, image, video, or audio-based message that the club may wish to disseminate to its members. For example, a message may include the dinner menu for the day, social events that are upcoming or have past, sporting events that are upcoming or have past, media from past events, new member announcements, and/or any other similar type of information. The messages may also include requests for a response or other information from the user. For example, a message about a sporting event may include a request for whether the user wishes to participate. As another example, a message about a dinner menu may include a request for whether the user would like to place a to go order or would like to make a reservation in the dining room.

The communication channel messages 150 may include the content of each message, the time and date that the communication service server 112 received the message, data identifying an interest group associated with the message, data identifying a club associated with the message, data identifying an author or sender of the message, a link to additional information, and/or any other similar information.

The message manager 142 may also be configured to receive responses to the communication channel messages 150 and store those responses in the communication channel responses 152. The communication channel responses 152 may include the content of each response, data identifying the corresponding message or response to which the response responded, data identifying an author or sender of the response, a time and date that the communication service server 112 received the response, a link to any suitable additional information, and/or any other similar information.

The message manager 142 may provide the communication channel data 128 to the user interface manager 114. The message manager 142 may provide the communication channel data 128 in response to a request from the user interface manager 114. For example, the user 108 may open the native application 110 and select the tennis interest group. The native application 110 may transmit a request for data in the tennis interest group. The application interface 118 may receive the request, and the user interface manager 114 may request that the message manager 142 provide communication channel data related to the tennis interest group. The message manager 142 may access the communication channel data 128 and provide the messages and responses related to the tennis interest group to the user interface manager 114. The application interface 118 may provide the messages and responses related to the tennis interest group to the native application 110 for the user 108 to view and interact with.

In the case where the user 108 provides a response to the content of the tennis interest group, the native application 110 may provide the response to the application interface 118. The user interface manager 114 provides the response to the message manger 142. The message manager 142 stores the response in the communication channel responses 152 along with other related data such as data identifying the corresponding message or response to which the response responded, data identifying an author or sender of the response, a time and date that the communication service server 112 received the response, a link to any suitable additional information, and/or any other similar information. The newly stored response is ready for the message manager 142 to provide to the user interface manager 114 in response to a subsequent request.

In addition to the native application interface 118, the user interface manager 114 may include a web application interface 116. The web application interface 116 may be configured to provide similar functionality to the native application interface 118 but through a web application that is running in a browser on the computing device of the user. The user may provide input into the web application. The message manager 142 may receive the input and store the input in the communication channel data 128 and/or provide the user's input to another computing device or storage location.

In some implementations, the native application 110, a web application, and/or any other similar type of application may not be club specific. Instead, the native application 110 may include an application that allows the user 108 of the computing device 106 to access communications from multiple clubs. In this case, the native application interface 118 may be configured to receive messages from multiple clubs and provide those messages to the appropriate native applications. The web application may also allow the user access to messages from multiple clubs.

There may be instances where the message manager 142 is attempting to transmit communication channel data to a user, and, for various reasons, the user may be unable, unwilling, and/or uninterested in receiving message through the interfaces included in the user interface manager 114. In this case, the communication service server 112 may include a communication adapter 126 that is configured to interact with different communication modes that may be different than those that that the user interface manager 114 is configured to.

In some implementations, before the message manager 142 attempts to transmit a message to a user 140, the message manager 142 may access the user characteristics 131. The user characteristics 131 may have various information related to the various members of the clubs for which the communication service server 112 manages communications. The user characteristics 131 may be located in a storage device that is included in the communication service server 112 and/or accessible by the communication service server 112. The user characteristics 131 may include, among other information, whether a user is unable, unwilling, and/or uninterested in receiving communication channel data through the interfaces included in the user interface manager 114. If the message manager 142 is attempting to transmit communication channel data to a user 140 who is unable, unwilling, and/or uninterested in receiving communication channel data through the interfaces included in the user interface manager 114, then the message manager 142 may identify an appropriate interface for the user 140 and utilize the communication adapter 126 to communicate with the user 140.

In some implementations, the message manager 142 may not initially access the user characteristics 131 before attempting to transmit communication channel data to a user 140. In this case, the message manager 142 may provide the communication channel data to the user interface manager 114. The user interface manager 114 may attempt to utilize the available interfaces, such as the web application interface 116 and the native application interface 118, to transmit the communication channel data to the user 140. The user interface manager 114 may generate an error because the available interfaces were unable to transmit the communication channel data to the user. This may occur because the user 140 does not have the native mobile application installed on the computing device 138, does not have an account with the native mobile application and/or the web application, and/or any other similar reason. In some implementations, the user interface manager 114 may generate an error if the user 140 does not view the communication channel data within a threshold period of time, such as three days.

To determine the appropriate interface for providing the message to the user 140, the message manager 142 may request that the user interface determiner 124 identify a communication method to communicate with the user 140. The user interface determiner 124 may be implemented by one or more processors executing software stored in a storage device. The message manager 142 may make that request in response to receiving an error from the user interface manager 114 and/or determining that the user characteristics 131 for the user 140 indicated that the user 140 is unwilling, unable, and/or uninterested in receiving communications through the available interfaces.

The user interface determiner 124 may analyze the user characteristics 131 for the user 140. Based on that analysis, the user interface determiner 124 may select a communication method for the user 140. In some implementations and in response to selection of the communication method for the user 140, the message manager 142 may update the user characteristics 131 for the user 140 indicating the selected communication method and/or the communication attempt using the selected communication method.

The user characteristics 131 may include data indicating the clubs to which the user is a member, the interest groups that the user is associated with, the communication methods that the user has responded to, the communication methods that the user has not responded to, timestamps indicating when the user has utilized a communication method, timestamps indicating when the user has received a message and the corresponding communication method, timestamps indicating when a user has output a message and the corresponding communication method, demographic information, the type of member that the user is of the different clubs that the user is associated with, data identifying computing devices of the user, a date the user joined each club, data indicating to the resources of the clubs that the user utilizes, and/or any other similar characteristics of the user.

The user interface determiner 124 may analyze the user characteristics 131 for the user 140 using various models and/or rules. The models may be trained using historical data and machine learning. The models may be configured to receive the user characteristics 131 for the user 140 and output data indicating a communication method to use to communicate with the user 140. The rules may specify various ranges, thresholds, logical statements, and/or other comparison techniques to apply to the user characteristics 131 for the user 140. Based on those comparisons, the rules may specify a communication method to use to communicate with the user 140. In some implementations, the user interface determiner 124 may also analyze the communication channel data to be provided to the user 140.

The user interface determiner 124 may select a communication method that corresponds to the capabilities of the communication adapter 126. The communication adapter 126 may be configured to communicate using various communication methods and provide data identifying those communication methods to the user interface determiner 124. In some implementations, the models may also be configured to receive data identifying the communication methods of the communication adapter 126. In some implementations, the comparison techniques of the rules may utilize the communication methods of the communication adapter 126.

As noted above, the communication service server 112 may include a communication adapter 126. The communication adapter 126 may be implemented by one or more processors executing software stored in a storage device. The communication adapter 126 may be configured to convert a message that is configured to be output to one interface into a message that is configured to be output to a different interface. The message converter 146 may be configured to convert a message from one interface to another interface. Converting a message may involve parsing the message to identify the content of the message. With the message parsed, the message converter 146 may adapt the components of the message to comply with any suitable requirements of the selected communication method. The communication adapter 126 may include a response converter 148 that may perform similar conversions in reverse in order to allow responses from the user to be interpreted and processed by the interface that provided the message to the communication adapter 126.

In other words, the interfaces of the user interface manager 114 may provide messages to an application that is running on a computing device, such as computing device 106 or provide messages to the communication adapter 126. The interfaces of the user interface manager 114 may provide the same type of message whether the message is for the application on the computing device 106 or the communication adapter 126. Similarly, the user interface manager 114 may receive the same type of responses whether the response is from the application on the computing device 106 or the communication adapter 126.

The communication adapter 126 may include a message/response characteristics determiner 144. The message/response characteristics determiner 144 may be configured to determine the characteristics of the message to be provided to the user 140 and/or the response received from the user 140. The message/response characteristics determiner 144 may include a parser that is configured to parse the message or response. The message/response characteristics determiner 144 may identify the different components of the message or response based on the parsing. In some implementations, the likely components may depend on whether the message/response characteristics determiner 144 is parsing a message or a response. For a message, the likely components may include an author of the message, the posting date of the message, any suitable responses to the message, the authors of those responses, the posting date of the responses, the content of the message, a date associated with the content, for example, the date of an event, and/or any other similar component.

In some implementations, message/response characteristics determiner 144 may be configured to identify the application interface to which the message was configured. The message/response characteristics determiner 144 may receive data from the message manager 142 and/or the user interface manager 114 indicating the application interface. The message/response characteristics determiner 144 may also be configured to identify an application from which the response was received. The message/response characteristics determiner 144 may receive application identifying data from the application itself. In some implementations, the message/response characteristics determiner 144 may determine the identity of the application based on the identity of the application for which the message converter 146 converted the message that preceded the response.

In the example of FIG. 1 and in stage A, message manager 142 may determine to provide a message to the user 140 through an email interface, and the user interface manager 114 may include a web application interface 116 and a native application interface 118. Because the user interface manager 114 does not include an email interface, the message manager 142 may instruct the user interface manager 114 to provide the message to the communication adapter 126.

In some implementations, the message manager 142 may access the message from the communication channel messages 150 and provide the message to the communication adapter 126. The message manager 142 may indicate that the message is formatted according to the techniques used in the communication channel data 128. In some implementations, the message manager 142 may instruct the user interface manager 114 to access the message from the communication channel messages 150 and provide the message to the communication adapter 126. In this case, the user interface manager 114 may use the web application interface 116 or the native application interface 118 to format the message. The user interface manager 114 may provide the message to the communication adapter 126 along with data indicating whether the message is formatted according to the web application interface 116 or the native application interface 118.

The communication adapter 126 may receive the message and the instructions to convert the message for an email interface, and the message/response characteristics determiner 144 may analyze the message according to the specified format. The message/response characteristics determiner 144 may determine that the message is from Club Acme, is related to the golf interest group, describes an event of the Club Acme Golf Tournament, the date of the event is Jan. 20, 2023. The message/response characteristics determiner 144 may provide these components of the message to the message converter 146.

The message converter 146 may receive the components of the message and instructions to convert the message for an email interface. The message converter 146 may access message conversion rules that may specify how to encode or format a message for the specified interface. The message conversion rules are discussed in more detail below in relation to FIG. 2. The message conversion rules may specify how to convert a message for an email interface and where to transmit the converted message. The message conversion rules may specify to include a from field, a to field, a subject field, and a body of the email. The message conversion rules may specify to access the email address of the user 140 for the to field from the user characteristics 131. In this example, the email address of the user 140 may be alice@email.com. The message conversion rules may specify how to generate the from address. In this example, because the message is from Club Acme, the domain of the email address may be clubacme.com. The message conversion rules may also specify that the username of the email address should be related to the interest group of the message. In this example, the username of the email address is golf because the interest group of the message is golf.

The message conversion rules may further specify that the subject of the email 132 should be text from the message. The text may include a compound noun or an adjective and a noun. In this example, the message converter 146 may select golf tournament as the subject. The message conversion rules may specify that the body of the email 132 should be the content of the message in a complete sentence. In this example, the message converter 146 may select, "Club Acme Golf Tournament is Jan. 20, 2023," as the body of the email 132. The message converter 146 may indicate to the communication adapter 126 that the email 132

In stage B, the communication adapter 126 may transmit the converted message in a manner that is appropriate for the converted message. For example, the communication adapter 126 may transmit the email 132 to an email server for the domain of the email address of the user 140. As another example, the communication adapter 126 may call the phone number of the user if the converted message is a phone call. As another example, the communication adapter 126 may output a text message to a telecommunication server if the converted message is a text message. In the example of FIG. 1, the communication adapter 132 transmits the email 132 to the email.com server. The email.com server makes the email available for reading by the user 140 through an email application on the computing device 138.

In stage C, the user 140 may view the email 132 on the computing device 138. The user 140 may view the email 132 using an email application, a native application, and/or any other similar application. The user 140 may reply to the email 132 through the application. The user 140 may draft the response 130 and include a message in the response 130 the text, "I'll definitely be playing." The user 140 may send the response 130 through the email interface on the computing device 138.

The response 130 may be directed back to the communication adapter 126 based on the to field of the response 130. The response converter 148 may analyze the response 130 and store data related to the response in the communication channel responses 152. The response converter 148 may operate similarly to the message converter 146 but in reverse. The response converter 148 may be configured to determine the content of the response 130, format the content of the response 130, and store the formatted content in the communication channel responses 152. The communication channel responses 152, which includes the response 130, may be available for distribution to the users.

The response converter 148 may be configured to analyze various types of responses. Those types of response may include email responses, voice responses, text message responses, and/or any other similar type of communication that the message converter 146 is capable of outputting. The message converter 146 may provide the response 148 data indicating the type of interface used to provide a message to a user. Based on that interface, the response converter 146 may access the response conversion rules that indicate how to convert various responses to data to be stored in the communication channel responses 152. The response conversion rules may be discussed in more detail below in relation to FIG. 2. The response converter 148 may access the appropriate response conversion rule based on the data from the message converter 146 indicating the type of interface used to provide the message to the user.

In stage D, the response converter 148 may identify the different components of the response 130. The response converter 148 may identify the to field of golf@clubacme.com. The response converter 148 may also identify the from field of alice@email.com. The response converter 148 may identify the subject of "RE: Golf Tournament," and the body of, "I'll definitely be playing." The response converter 148 may determine that the name of the user 140 is Alice based on the from field and/or any suitable additional signature in the body of the response 130. In some implementations, the response converter 148 may receive data identifying the user 140 from the message converter 146 when the message converter 146 generates the converted message. The response converter 148 may also determine that the response 130 is a reply to the email 132 based on the subject. The response converter 148 may generate a communication channel response to store in the communication channel responses 152. The communication channel response that the response converter 148 stores in the communication channel responses 152 may indicate that the user Alice provided a comment on Jan. 4, 2023 to the message that announced the Club Acme Golf Tournament that is on Jan. 20, 2023. The comment is, "I'll definitely be playing."

In some implementations, the message converter 146 may include a tag in the converted message. This tag may be configured to remain in the response. The message converter 146 may provide the tag to the response converter 148. When the response converter 148 receives a response, the response converter 148 may compare the tag in the response to the tags received from the message converter 146. Based on a match of the tags, the message converter 146 may provide data related to the message and the response, such as an identity of the user, an interest group related to the message, a date related to an event in the message, and/or any other similar information. The tag may be a picture or code included an email, a code included in a text message, a frequency pattern included in voice communications, and/or any other similar tag.

In some implementations, the communication adapter 126 may maintain a tag-context map that enables the communication adapter 126 to connect incoming responses or requests with previously sent messages and/or communication channels. The message converter 146 may store data in the tag-context map that associates an outgoing message with a tag. The response converter 148 may receive a response that includes a tag. The response converter 148 may access the tag-context map to determine which message the response is responding to. In some implementations, communication channels with multiple message may include a common tag. This common tag may be in addition to individual tags for each message. In this way, the tag-context map may include more than one tag that corresponds to a message. One tag may be unique to each message and another tag may correspond to the communication channel that the message is included in. With these multiple tags, the response converter 148 may determine which communication channel a response belongs to and which message the response belongs to. In some implementations, the tag may be incorporated into a message field that is not typically visible when the message is displayed or presented to the user. For example, the message field may part of an email and may be a field that is typically not visible when a user is viewing the email in an email client.

With the response 130 stored in the communication channel responses 152, the response may be ready for output to other users who request to view the corresponding message and/or the communication channel that includes the message. In stage E, the user 108 may be interacting with the computing device 106 that is executing the native application 110. The user 108 may request to view the communication channel for Club Acme. The native application 110 may provide a request to the communication service server 112 for the communication channel for Club Acme.

The native application interface 118 of the user interface manager 114 may receive the request for the communication channel for Club Acme and provide the request to the message manager 142. The message manager 142 may access the communication channel data 128 and access the corresponding messages and responses for the communication channel for Club Acme. The message manager 142 may identify two messages. The first message may be for the dinner menu for Jan. 15, 2023. The communication channel responses 152 may include a comment to the first message from Bob. The comment from Bob may be, "What's the soup of the day?" The second message may be for the Club Acme Golf Tournament on Jan. 20, 2023. The communication channel responses 152 may include a comment to the second message from Alice. This comment may correspond to the response 130. The comment from Alice may be, "I'll definitely be playing."

In some implementations, the message converter 146 may include a unique identifier in the email 132 or other type of communication, such as voice communications or messaging communications. The message converter 146 may store the unique identifier in the messages 150 along with data such as an identity of an author of the email 132, data identifying group of the club associated with the email 132, data identifying a person or group who should respond to a reply to the email 132, and/or any other similar information. The unique identifier may be configured such that any reply communication will also include the unique identifier. For example, the email 132 may include an image or text code in the body of the email 132. A voicemail may include a request to speak a sequence of numbers or letters when responding to the voice communication. With this feature, the message/response characteristics determiner 144 and/or response converter 148 may be able to identify communications in the entire chain. For example, the message/response characteristics determiner 144 and/or response converter 148 may determine, based on the unique identifier embedded in the email 132, that response 130 is a reply to email 132.

By being able to identify the previous communication and/or other communications in the communication chain, the response converter 148 may determine an appropriate process to apply to the response 130. The response converter 148 may route the response 130 to the person who wrote the email 132, the department associated with the email 132, and/or a person response for replying to the response 130. The response converter 148 may perform an automated processing of the response 130. The response converter 148 may store any response or posting from a person or individual or an automatically generated response or posting in the responses 152 along with the unique identifier to link the response to the communication chain.

In stage E, the message manager 142 may provide the two messages and the related responses to the user interface manager 114. The native application interface 118 may generate the communication channel data packet 104 that includes the two messages and the related responses. The native application 110 may receive the communication channel data packet 104 and generate a user interface 102 based on the data in the communication channel data packet 104. The user interface 102 may be formatted in a way to allow the user 108 to view the messages in the communication channel for Club Acme and the responses that other users have left to the messages. For example, the user interface 102 may include the response 130 from user 140 indicating that she will be playing in the golf tournament. Even though the user 140 interacted with the communication channel for Club Acme through an email interface, the user 140 can still interact with other users who use different interfaces such as a native application interface.

Figure 2:
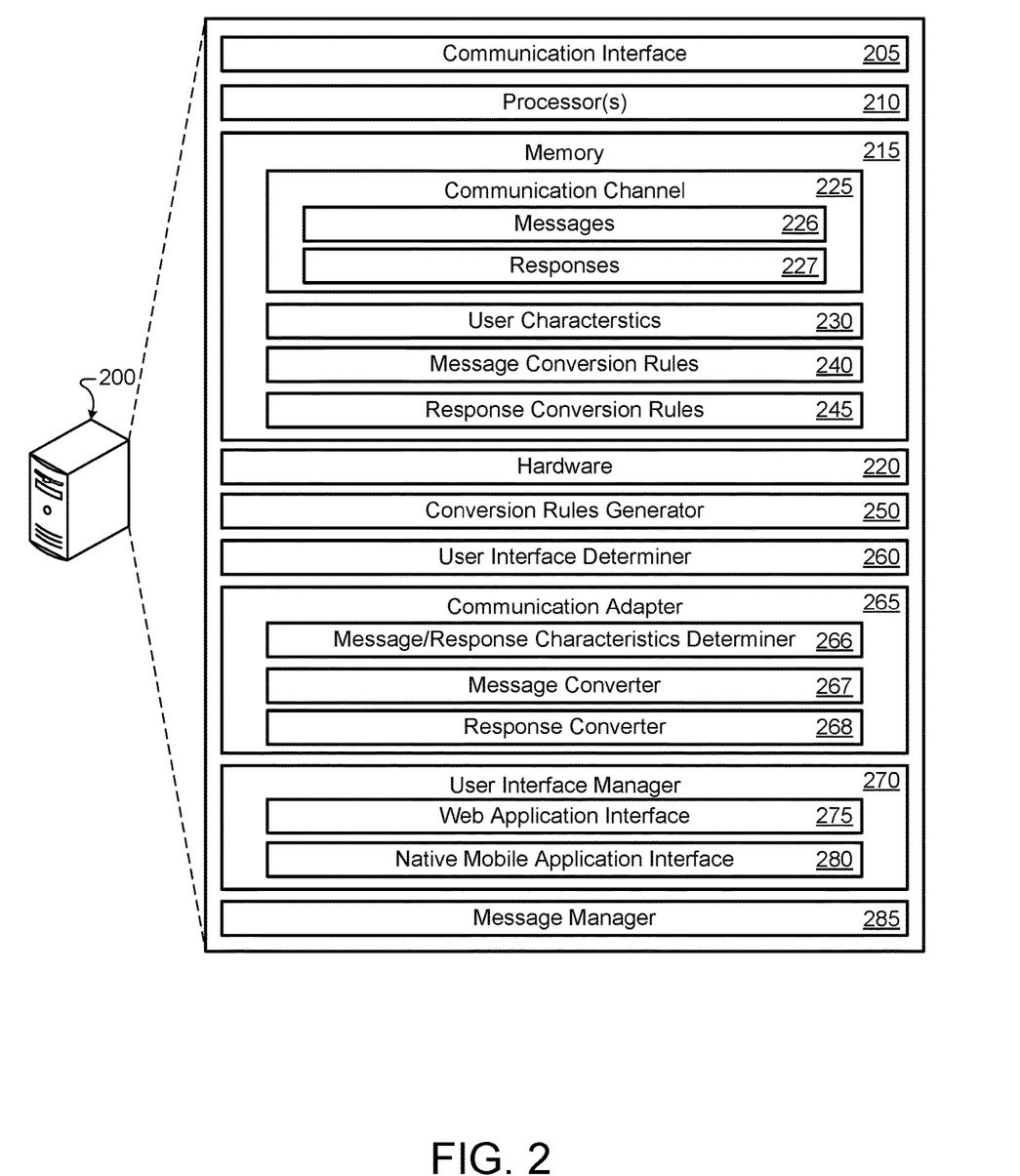
FIG. 2 illustrates an example server that is configured to integrate multiple interfaces of a communication service in accordance with at least one embodiment.

FIG. 2 illustrates an example server 200 that is configured to integrate multiple interfaces of a communication service. The server 200 may include any suitable type of computing device that is configured to communicate with other computing devices. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the communication service server 112 of FIG. 1. Some of the components of the device may be implemented in a single computing device or distributed over multiple computing devices. Some of the components may be in the form of virtual machines or software containers that are hosted in a cloud in communication with disaggregated storage devices. In some implementations, the server 200 may include a virtual device hosted in the cloud.

The server 200 may include a communication interface 205, one or more processors 210, memory 215, and hardware 220. The communication interface 205 may include communication components that enable the server 200 to transmit data and receive data from other devices and networks. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any suitable method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a message manager 285. The message manager 285 may be similar to the message manager 142 of FIG. 1. The message manager 285 may be configured to receive new messages for the communication channel, respond to requests for messages of a communication channel, maintain various communication channels, provide messages of a communication channel, receive responses to messages, output responses to messages, determine destinations for responses, and/or any other similar communication.

The message manager 285 may store the received messages in the communication channel messages 226 of the communication channel data 225. The message manager 285 may store the received responses in the communication channel messages 227 of the communication channel data 225. The communication channel data 225 may be similar to the communication channel data 128 of FIG. 1. The communication channel messages 226 may be similar to the communication channel messages 150 of FIG. 1. The communication channel responses 227 may be similar to the communication channel responses 152 of FIG. 1. The communication channel messages 226 may include messages received by various clubs and/or any other similar data. The communication channel messages 226 may include data identifying an author of the message, a date of the message, a date of an event associated with the message, a date to remove the message from being provided to users, and/or any other similar data. In some implementations, the communication channel messages 226 may include data indicating which club and/or interest groups a message may belong to. The communication channel responses 227 may include responses to the communication channel messages 226. The communication channel responses 227 may include data identifying an author of the response, data identifying the message or response to which the response is replying, a date of the response, a destination of the response, and/or any other similar content. The destination of a response may indicate whether the response should be included in the communication channel, is intended for a staff member of the club, indicates whether the user wishes to reserve a spot, and/or any other similar destination.

The memory may include the user characteristics 230. The user characteristics 230 may be similar to the user characteristics 131 of FIG. 1. The user characteristics 230 may include data indicating the clubs to which the user is a member, the interest groups that the user is associated with, the communication methods that the user has responded to, the communication methods that the user has not responded to, timestamps indicating when the user has utilized a communication method, timestamps indicating when the user has received a message and the corresponding communication method, timestamps indicating when a user has output a message and the corresponding communication method, demographic information, the type of member that the user is of the different clubs that the user is associated with, data identifying computing devices of the user, a date the user joined each club, data indicating to the resources of the clubs that the user utilizes, and/or any other similar characteristics of the user.

The one or more processors 210 may implement a user interface manager 270. The user interface manager 270 may be similar to the user interface manager 114 of FIG. 1. The user interface manager 270 may be configured to manage various interfaces for different communication methods that the server 200 uses to communicate with users. The user interface manager 270 may receive a message from the message manager 285 and an instruction to transmit the message using a particular communication method to a user. The user interface manager 270 may also receive responses from users and communications between users through the interfaces included in the user interface manager 270.

As an example, the user interface manager 270 may include a web application interface 275. The web application interface 275 may be configured to communicate with web applications that may be running in browsers located on the computing devices of users. The web application interface 275 may be similar to the web application interface 116 of FIG. 1. As another example, the user interface manager 270 may include a native mobile application interface 280. The native mobile application interface 280 may be configured to communicate with native applications that may be running on the computing devices of users. The native mobile application interface 280 may be similar to the Club Acme application interface 118 of FIG. 1.

The one or more processors 210 may implement a user interface determiner 260. The user interface determiner 260 may be similar to the user interface determiner 124 of FIG. 1. The user interface determiner 260 may be configured to use various interface determination rules and/or the interface determination models to analyze the user characteristics 230. The user interface determiner 260 may also analyze a message and data identifying a user who is to receive the message. Based on that analysis, the user interface determiner 260 may identify a user interface to communicate the message to the user. The user interface determiner 260 may provide data identifying the interface to the message manager 285 and/or the user interface manager 270.

The one or more processors 210 may implement a communication adapter 265. The communication adapter 265 may be similar to the communication adapter 126 of FIG. 1. The communication adapter 265 may be configured to interface between an interface of the user interface manager 270 and an application on the computing device of the user. The application on the computing device may be the application that corresponds to the interface selected by the user interface determiner 260.

The communication adapter 265 may include a message/response characteristics determiner 266. The message/response characteristics determiner 266 may be similar to the message/response characteristics determiner 144 of FIG. 1. The message/response characteristics determiner 266 may be configured to determine the various characteristics of a message or a response. The characteristics of a message may include an author of the message, the posting date of the message, any suitable responses to the message, the authors of those responses, the posting date of the responses, the content of the message, a date associated with the content, for example, the date of an event, and/or any other similar component. The characteristics of a response may include an author of the response, the posting date of the response, any suitable responses to the response, the author of those responses, the posting date of those responses, the content of the response, a date associated with the content, such as the date of an event, and/or any other similar component. The message/response characteristics determiner 266 may determine these characteristics based on data received from other components of the server 200 and/or by parsing the message or response.

The communication adapter 265 may include a message converter 267. The message converter 267 may be similar to the message converter 146 of FIG. 1. The message converter 267 may be configured to convert messages that are compatible with one interface to another interface. For example, the message converter 267 may convert a message that is configured to be output to a web application to a message that is configured to be output through a voice interface. The communication adapter 265 may include a response converter 268. The response converter 268 may be similar to the response converter 148 of FIG. 1. The response converter 268 may be configured to convert responses that are received from one interface to a format that compatible with other interfaces. For example, the response converter 268 may convert a voice-based response to a format that is compatible with the communication channel responses 227 and that can be used by the user interface manager 270.

The message converter 267 and the response converter 268 may use the message conversion rules 240 and the response conversion rules 245 to convert messages and responses between interfaces. The message conversion rules 240 and the response conversion rules 245 may be located in the memory 215. The message conversion rules 240 may include instructions for the various types of application interfaces included in the user interface manager 270. The instructions may indicate how to identify the different components of the messages output by the interfaces included in the user interface manager 270. For example, the message conversion rules 240 may indicate how to identify the author, contents, posting date, interest group, associated club, associated events and/or any other similar contents of a message and/or how to locate and process any unique identifiers. The message conversion rules 240 may include instructions for messages formatted for the web application interface 275 and for the native application interface 280.

The message conversion rules 240 may also indicate how to generate messages that are formatted for different interfaces. Those interfaces may include voice interfaces, email interfaces, text interfaces, and/or any other similar type of interface. For example, the voice interface instructions may include instructions about how to order the different components of a message in a sentence or phrase. The voice interface instructions may also include a speech synthesizer that generates synthesized voice of the sentence or phrase. As another example, the email interface instructions may include instructions about how to format an email using the different components. The email interface instructions may include how to generate a subject, how to identify an email address of the user, how to determine the sending email address, what to include in the body of the email, and whether to include any suitable attachments or links in the email. The message interface instructions may include instructions about how to order the different components of a message in a sentence or phrase, how to determine a phone number or messaging address of the user, and whether to include any suitable media content or links.

The response conversion rules 245 may indicate how to parse and/or analyze responses received from different interfaces. Those interfaces may include voice interfaces, email interfaces, text interfaces, and/or any other similar type of interface. For example, the voice interface instructions may include instructions about how to identify different components of a transcription. The voice interface instructions may also include a speech recognizer that generates transcriptions of the audio data. As another example, the email interface instructions may include instructions about how to identify different components of an email response. The email interface instructions may include how to identify the likely sender of an email and how to match up an email response with an initial email message.

The one or more processors 210 may implement a conversion rules generator 250. The conversion rules generator 250 may be configured to generate rules to determine the content of messages and responses. The conversion rules generator 250 may be configured to receive rules specified by users. For example, a user may specify how to identify the components of a message configured to be output to a native application. A user may also specify how to identify the components of a response.

The conversion rules generator 250 may also analyze historical data that includes previous communications involving the additional interfaces that the conversion rules generator 250 is attempting to generate rules for. For example, the conversion rules generator 250 may analyze emails related to club activities. Based on this analysis, the conversion rules generator 250 may identify patterns in emails and convert those patterns to rules to assist in identifying components of various email responses and to assist in identifying the types of data to include in email-based messages. As another example, the conversion rules generator 250 may analyze voice communications related to club activities. Based on this analysis, the conversion rules generator 250 may identify patterns in the transcriptions of the voice communications and convert those patterns to rules to assist in identifying components of various voice responses and to assist in identifying the types of data to include in voice messages.

In some implementations, the communication adapter 265 may be configured to handle additional interfaces. In this case, the conversion rules generator 250 may generate and/or receive rules for how to process messages and responses in those additional interfaces. By allowing additional interfaces to be added, the server 200 may increase the likelihood that the server 200 is able to communicate and engage with all or nearly all of the members of a club using their preferred interface.

In some implementations, interactions between the interface of the user interface manager 270 and the application on the computing device of the user may require some type of authentication. The communication adapter 265 may be configured to manage the authentication aspect to ensure that authentication remains even if the user utilizes a different interface. The communication adapter 265 may manage and provide any suitable tokens or other authentication data to the interface of the user interface manager 270 to simulate an application running on a computing device of the user. The communication adapter 265 may also manage and/or respond to any suitable tokens or other authentication data received from the actual application running on the computing device of the user. By managing the authentication of the various applications, the interface of the user interface manager 270 and the application on the computing device of the user are unaware that each is communicating with the communication adapter 265 instead of the counterpart application or interface.

Figure 3:
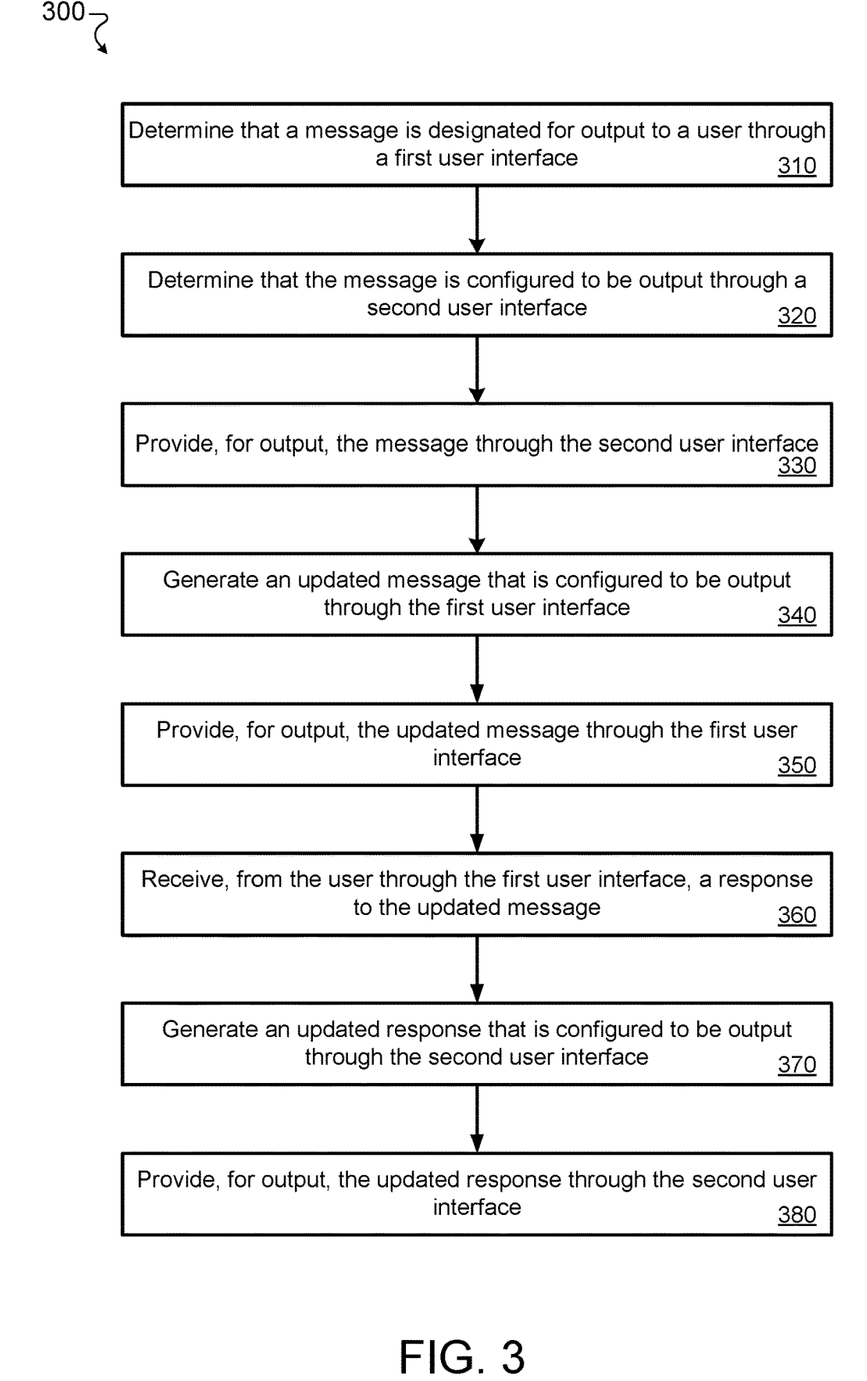
FIG. 3 is a flowchart of an example process for integrating multiple interfaces of a communication service in accordance with at least one embodiment.

FIG. 3 is a flowchart of an example process 300 for integrating multiple interfaces of a communication service. In general, the process 300 utilizes a communication service to provide club members access to various content related to the club. The communication service may use various interfaces to provide access to that content. Some users may be uninterested, unwilling, and/or unable to access the content through the provided interfaces. In this case, the process 300 may utilize a different interface to provide those users access to the content while still allowing users using different interfaces to interact with each other. The process 300 will be described as being performed by the server 112 of FIG. 1 and will include references to other components in FIG. 1. The process 300 may also be performed by the server 200 of FIG. 2. In some implementations, the process 300 may be performed by one or more computing devices, including virtual computing devices.

The server 112 determines that a message is designated for output to a user through a first user interface (310). In some implementations, a club may utilize the communication service to interact with members of the club. Multiple clubs may use the communication service and some members may belong to more than one club. The communication service may use various interfaces such as a web application or a native application. The native application may run on a mobile device such as a phone or tablet or on another type of computing device. Some users may be unwilling, unable, and/or uninterested in accessing the messages of the communication service through the web application or the native application. Those users may prefer the first user interface which may include an email interface, a voice interface, a text messaging interface, and/or any other similar type of interface. In some instances, these users may make their preferences known to the server 112 by way to requesting communication through alternate means. In some instances, the server 112 may be configured to identify these individuals automatically. By automatically identifying these users, the server 112 may increase engagement more than relying on the users to manually indicate if they request communications through an alternate means.

To automatically identify the users who may be unwilling, unable, and/or uninterested in accessing the messages of the communication service through the web application or the native application, the server 112 may analyze the characteristics of the user. The characteristics of the user may include data indicating the clubs to which the user is a member, the interest groups that the user is associated with, the communication methods that the user has responded to, the communication methods that the user has not responded to, timestamps indicating when the user has utilized a communication method, timestamps indicating when the user has received a message and the corresponding communication method, timestamps indicating when a user has output a message and the corresponding communication method, demographic information, the type of member that the user is of the different clubs that the user is associated with, data identifying computing devices of the user, a date the user joined each club, data indicating to the resources of the clubs that the user utilizes, and/or any other similar characteristics of the user.

In some implementations, the characteristics of the user may include data indicating that the user accesses the web application or the native application at a periodic frequency that is less than a threshold periodic frequency. The server 112 may determine the threshold periodic frequency based on various factors. In some implementations, the server 112 may determine the threshold periodic frequency based on a percent of the members of a club who interact with the communication service using the web application or the native application. A higher percentage of members may result in a larger threshold periodic frequency. In some implementations, the server 112 may determine the threshold periodic frequency based on characteristics of the user. For example, an older user may have a lower threshold periodic frequency than a younger user.

The server 112 determines that the message is configured to be output through a second user interface (320). In some implementations, the second user interface may include the web application or the native application. The message may be configured to be output through the web application or the native application because most of the users who interact with the communication service use the web application or the native application. The server 112 may default to using the web application or the native application.

The server 112 provides, for output, the message through the second user interface (330). In some implementations, multiple users may request to view the message. The request may be the result of a user viewing a communication channel that includes the message. The user may view the communication channel on a web application or a native application. The server 112 may output the message in response to the request.

The server 112 generates an updated message that is configured to be output through the first user interface (340). The server 112 may include a communication adapter 126 that is configured to update messages so that the messages can be output through different user interfaces. For example, the communication adapter 126 may update a message configured for output through a web application to be output through a voice interface. The communication adapter 126 may use message conversion rules to parse the message and use the parsed message to generate the updated message. In some implementations, the communication adapter 126 may determine the characteristics of the message and use those characteristics to determine how to parse the message and/or generate the updated message.

In some implementations, the server 112 may include a tag in the updated message. The tag may be unique to the message or unique to the communication channel that the message is included in. In some instances, an updated message may include more than one tag. The server 112 may also include instructions for the application on the computing device that receives the updated message to include the one or more tags in the response. The server 112 may generate and store a tag map that relates tags to messages and/or communication channels.

The server 112 provides, for output, the updated message through the first user interface (350). The server 112 may output the updated message through a voice interface, an email interface, a messaging interface, and/or any other similar interface. In some implementations, the server 112 may include a tag that is configured to be included in a response to the message. The tag may assist the server 112 in determining which responses correspond to which messages.

The server 112 receives, from the user through the first user interface, a response to the updated message (360). The form of the response may depend on the first interface. For example, if the user receives the updated message through a voice interface, then the response may be in the form of a voice message from the user. The type of response that the user may provide may depend on the message. For example, a message that is announcing an event may result in the user providing a response that indicates whether the user will attend the event or that is a comment on the event. A message that describes the dinner menu for the day may result the user providing a response that is a comment on the menu or a request for a reservation. Other messages may result in other types of responses such as questions for the staff of the club or any other type of response.

In some implementations, the server 112 may determine that the response includes one or more tags. The server 112 may access the tag map to determine which message and/or communication channel the response corresponds to. The server 112 may use the tag information to store the response in relation to the corresponding message.

The server 112 generates an updated response that is configured to be output through the second user interface (370). In some implementations, the server 112 may determine the characteristics of the response. The characteristics may be the same type of characteristics of the message. The characteristics may include whether the response is a question for the staff, a comment on the message, a request to attend the event, and/or any other type of comment. The server 112 may determine whether to generate the updated response based on the characteristics of the message and/or the response. The server 112 may determine a destination for the updated response based on the characteristics of the message and/or the response. In some implementations, if the server 112 determines that the response is a comment on the message, then the server 112 may convert the response so that the response can be output to other users who are viewing the message, such as through a communication channel that includes the message. The communication channel may be similar to a newsfeed.

The server 112 provides, for output, the updated response through the second user interface (380). By outputting the updated response, the server 112 allows other users who may use the native application or web application interface to view and/or interact with other users who may be using other interfaces such as email, voice, text, and/or any other similar interface. This interaction may be in the form of viewing responses by those users who are using the other interfaces such as email, voice, or text. In some implementations, the user who may use the native application or web application interface may leave an additional response to the response from the user who may use the other interfaces such as email, voice, or text. Depending on the characteristics of the additional response, the server 112 may determine to generate an updated additional response and provide that updated additional response to the user who may use the other interfaces such as email, voice, or text.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   providing, for output by a computing device, a message of a communication channel that is consumable through a second user interface;
   accessing, by the computing device, user characteristics of a user who is a recipient of messages of the communication channel, wherein the user characteristics indicate whether the user is unwilling, unable, or uninterested in accessing the messages of the communication channel through the second user interface and include data indicating first communication methods and associated first user interfaces though which the user has received a first previous message and responded to the first previous message, second communication methods and associated second user interfaces though which the user has received a second previous message and not responded to the second previous message, and timestamps indicating when the user previously utilized third communication methods and associated third user interfaces;
   based on the user characteristics, determining, by the computing device, to output the message to the user through a first user interface;
   in response to determining to output the message to the user through the first user interface, generating, by the computing device, an updated message that is configured to be output through the first user interface;
   providing, for output by the computing device, the updated message through the first user interface;
   receiving, by the computing device and from the user through the first user interface, a response to the updated message; and
   providing, for output by the computing device, the response to the updated message.

2. The method of claim 1, further comprising:
   receiving, by the computing device and from an additional user through the second user interface, an additional response to the response or the message;
   generating, by the computing device, an updated additional response that is configured to be output through the first user interface; and
   providing, for output by the computing device, the updated additional response through the first user interface.

3. The method of claim 2, further comprising:
   determining, by the computing device, characteristics of the additional response,
   wherein generating the updated additional response is based on the characteristics of the additional response.

4. The method of claim 1, wherein the second user interface comprises a web application or a smart phone application.

5. The method of claim 1, wherein the first user interface comprises an email interface or a voice interface.

6. The method of claim 1, further comprising:
   providing, for output by the computing device, an additional message of the communication channel that is consumable through the second user interface;
   based on the user characteristics that indicate whether the user is unwilling, unable, or uninterested in accessing the messages of the communication channel through the second user interface, determining, by the computing device, to output the additional message to the user through the first user interface;
   in response to determining to output the additional message to the user through the first user interface, generating, by the computing device, an updated additional message that is configured to be output through the first user interface;
   providing, for output by the computing device, the updated additional message through the first user interface;
   receiving, by the computing device and from the user through the first user interface, an additional response to the updated additional message;

generating, by the computing device, an updated additional response;
based on characteristics of the additional response or the updated additional message, determining, by the computing device, a destination for the updated additional response; and
providing, for output by the computing device and to the destination, the updated additional response.

7. The method of claim 1, further comprising:
determining, by the computing device, characteristics of the message and the first user interface,
wherein generating the updated message is based on the characteristics of the message and the first user interface.

8. The method of claim 2, wherein:
generating the updated message that is configured to be output through the first interface comprises:
including, in the updated message, a tag, and
receiving the additional response comprises:
determining that the additional response includes the tag; and
based on the tag, determining that the additional response corresponds to the updated message.

9. A system, comprising:
one or more processors; and
memory including a plurality of computer-executable components that are executable by the one or more processors to perform a plurality of acts, the plurality of acts comprising:
providing, for output, a message of a communication channel that is consumable through a second user interface;
accessing user characteristics of a user who is a recipient of messages of the communication channel, wherein the user characteristics indicate whether the user is unwilling, unable, or uninterested in accessing the messages of the communication channel through the second user interface and include data indicating first communication methods and associated first user interfaces though which the user has received a first previous message and responded to the first previous message, second communication methods and associated second user interfaces though which the user has received a second previous message and not responded to the second previous message, and timestamps indicating when the user previously utilized third communication methods and associated third user interfaces;
based on the user characteristics, determining to output the message to the user through a first user interface;
in response to determining to output the message to the user through the first user interface, generating an updated message that is configured to be output through the first user interface;
providing, for output, the updated message through the first user interface;
receiving, from the user through the first user interface, a response to the updated message; and
providing, for output, the response.

10. The system of claim 9, wherein the plurality of acts further comprise:
receiving, from an additional user through the second user interface, an additional response to the response or the message;
generating an updated additional response that is configured to be output through the first user interface; and
providing, for output, the updated additional response through the first user interface.

11. The system of claim 10, wherein the plurality of acts further comprise:
determining characteristics of the additional response,
wherein generating the updated additional response is based on the characteristics of the additional response.

12. The system of claim 9, wherein the second user interface comprises a web application or a smart phone application.

13. The system of claim 9, wherein the first user interface comprises an email interface or a voice interface.

14. The system of claim 9, wherein the plurality of acts further comprise:
providing, for output, an additional message of the communication channel that is consumable through the second user interface;
based on the user characteristics that indicate whether the user is unwilling, unable, or uninterested in accessing the messages of the communication channel through the second user interface, determining to output the additional message to the user through the first user interface;
in response to determining to output the additional message to the user through the first user interface, generating an updated additional message that is configured to be output through the first user interface;
providing, for output, the updated additional message through the first user interface;
receiving, from the user through the first user interface, an additional response to the updated additional message;
generating an updated additional response;
based on characteristics of the additional response or the updated additional message, determining a destination for the updated additional response; and
providing, for output to the destination, the updated additional response.

15. The system of claim 9, wherein the plurality of acts further comprise:
determining characteristics of the message and the first user interface,
wherein generating the updated message is based on the characteristics of the message and the first user interface.

16. One or more non-transitory computer-readable media storing computer-executable instructions that upon execution cause one or more computers to perform acts comprising:
providing, for output, a message of a communication channel that is consumable through a second user interface;
accessing user characteristics of a user who is a recipient of messages of the communication channel, wherein the user characteristics indicate whether the user is unwilling, unable, or uninterested in accessing the messages of the communication channel through the second user interface and include data indicating first communication methods and associated first user interfaces though which the user has received a first previous message and responded to the first previous message, second communication methods and associated second user interfaces though which the user has received a second previous message and not responded to the second previous message, and timestamps indicating when the user previously utilized third communication methods and associated third user interfaces;

based on the user characteristics, determining to output the message to the user through a first user interface;

in response to determining to output the message to the user through the first user interface, generating an updated message that is configured to be output through the first user interface;

providing, for output, the updated message through the first user interface;

receiving, from the user through the first user interface, a response to the updated message; and providing, for output, the response to the updated message.

17. The media of claim 16, wherein the acts further comprise:

receiving, from an additional user through the second user interface, an additional response to the response or the message;

generating an updated additional response that is configured to be output through the first user interface; and providing, for output, the updated additional response through the first user interface.

18. The media of claim 16, wherein the acts further comprise:

providing, for output, an additional message of the communication channel that is consumable through the second user interface;

based on the user characteristics that indicate whether the user is unwilling, unable, or uninterested in accessing the messages of the communication channel through the second user interface, determining to output the additional message to the user through the first user interface;

in response to determining to output the additional message to the user through the first user interface, generating an updated additional message that is configured to be output through the first user interface;

providing, for output, the updated additional message through the first user interface;

receiving, from the user through the first user interface, an additional response to the updated additional message;

generating an updated additional response;

based on characteristics of the additional response or the updated additional message, determining a destination for the updated additional response; and providing, for output to the destination, the updated additional response.

19. The method of claim 1, wherein the user characteristics further comprise demographic information of the user and data identifying a device of the user used to receive and respond to the messages of the communication channel.

20. The media of claim 16, wherein the acts further comprise:

determining characteristics of the message and the first user interface, wherein generating the updated message is based on the characteristics of the message and the first user interface.

21. The media of claim 16, wherein the user characteristics further comprise demographic information of the user and data identifying a device of the user used to receive and respond to the messages of the communication channel.

* * * * *